May 27, 1930.   F. JANSSEN   1,760,199
THERMOSTATIC REGULATOR VALVE
Filed Oct. 25, 1926
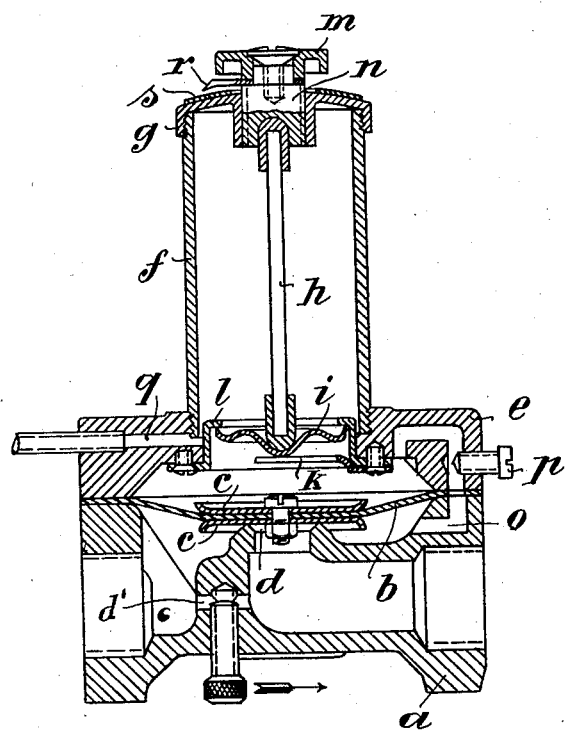
Inventor:
Friedrich Janssen.
by:
Watson, Coit, Morse & Grindle.
Attorney.

Patented May 27, 1930

1,760,199

UNITED STATES PATENT OFFICE

FRIEDRICH JANSSEN, OF OSNABRUCK, GERMANY, ASSIGNOR TO G. KROMSCHRÖDER AKTIENGESELLSCHAFT, OF OSNABRUCK, GERMANY, A COMPANY OF GERMANY

THERMOSTATIC REGULATOR VALVE

Application filed October 25, 1926, Serial No. 144,063, and in Germany October 28, 1925.

This invention comprises improvements in and connected with thermostatic regulator valves suitable for regulating the flow of heating media, such as gas, air, water or steam.

The invention is principally concerned with thermostat devices comprising a hard rubber tube screwed into the casing of an auxiliary valve and enclosing a steel rod which abuts at its upper end against the closure of the hard rubber tube and at its lower end against the auxiliary valve.

In regulators of this kind the hard rubber tube thermostat has been mounted on a base or plate adapted to be fixed to the wall of a room and surrounded by the air therein to be heated, the said thermostat controlling an auxiliary valve in a chamber connected by two tubes of small diameter to a chamber located at a distance from the thermostat and containing the main valve for regulating the flow of heating media. Thus, the regulator consisted of two distinct devices which were situated in two separate places and connected together by the tubes. Hard rubber tubing was employed, and in order to protect it against damage it was secured against the wall. For this purpose, and for economical reasons, it was necessary to make this tubing of small diameter. This introduced a defect, for the length of the thermostat tube must be comparatively great in order that a relatively large movement may be given to the auxiliary valve and considerable length of connecting tubing is liable to prevent the setting up of effective pressure differences by the auxiliary valve, seeing that the connecting tubing must be of as small diameter as possible.

The principal object of the present invention is to provide a constructional unit comprising a main valve, its control diaphragm, a hard rubber thermostat, and an auxiliary valve controlled by such thermostat so that the regulating valve, auxiliary valve and thermostat form a single unit of strong construction and are all disposed at one place. This unit is very suitable for use as a heat regulator in gas heating systems for rooms.

A further object is to construct a thermostatic device of the kind in question with the thermostat, auxiliary valve and throttle valve all on one and the same axis.

According to this invention, the thermostat, auxiliary valve and main valve with its diaphragm are all incorporated in one constructional unit, and the thermostat comprises a hard rubber tube having a diameter which is considerable in proportion to its length and wall thickness thereby enabling the auxiliary valve to be of particularly large diameter. The hard rubber tube, although naturally brittle, is very suitable for thermo-technical purposes and can be used with success because of the relatively large diameter which is given to it. Moreover, on account of the large diameter, it is possible considerably to reduce the thickness of its wall, in comparison with previous practice, without sacrifice of strength. It may be observed that the strength increases in inverse proportion to the length and with the third power of the diameter. Particularly good regulation is obtained with slight wall thickness, because the time decreases in which the thermostat tube assumes the temperature of the air in the room and the sensitiveness increases, as the thickness of the tube wall is decreased. For this reason, a further reduction in the length of the tube is possible. These improvements, therefore, result in the construction of a compact and sensitive instrument which is mechanically of great strength and capable of very efficient action from the thermo-technical point of view.

In order to enable the invention to be readily understood reference is made to the accompanying drawing illustrating in central vertical section one suitable construction in accordance with these improvements.

Referring to the drawing, $a$ is the regulator valve casing over which is stretched the diaphragm $b$ having its central portion clamped between two discs $c$ which act as the valve and serve to close or throttle the main port $d$ of the valve. The main current flow through the valve takes place in the direction of the arrow and from the space beneath the diaphragm a small current flows through the bye-pass $o$ into the chamber above the diaphragm. The strength of the small current through the bye-pass may be regulated by an adjustable screw $p$ or throttle device. The escape of the fluid from the upper chamber is controlled by an auxiliary valve $i$ which is of relatively large diameter and is adapted to seat itself upwardly against the seating $l$ fixed by screws in a central aperture in the cover $e$ of the device. The cover $e$ is fixed down on the casing $a$ by screw means, not shown, and serves for clamping the peripheral portion of the diaphragm $b$. The bye-pass current, throttled by the valve $i$ passes through the duct $q$. The valve $i$ may be depressed from its seat by a rod $h$ against the action of a flexible support $k$ and the pressure of the fluid below the valve $i$, the rod $h$ being adjustably mounted at its upper end in a cap or cover $g$ by the aid of a screw device $n$. As shown, the upper end of the rod $h$ enters a socket piece in the screw device $n$ which can be screwed upwards or downwards in a screw threaded sleeve formation on the cap $g$ which tightly closes the upper end of the thermostatic tube $f$ of hard rubber. A knob or handle $m$ is secured on the screw device $n$ by a central screw and in order to give indications of the adjustments, a pointer $r$ is clamped between the knob $m$ and screw device $n$ and is movable over a suitable scale on the cap $g$.

In the example illustrated, the tube $f$ is of cylindrical form having a very considerable diameter and slight wall thickness in proportion to its length. The tube need not necessarily be cylindrical but may be of conical or similar shape. In any case, regard must be paid to the features of relatively large diameter and slight wall thickness, as experiments have shown that it is advantageous to have the external diameter greater than one fifth of the free length of the tube and greater than twelve times the wall thickness, and it is these details of construction which make it possible to include the thermostat and the valve mechanism in a single unitary device. It will be understood that such an arrangement has hitherto been considered impractical by reason of the fact that valves of this type are ordinarily located near the floor where they are subject to rough treatment. For this reason the provision of a thermostat directly on the valve casing has not been considered feasible, since thermostats of hard rubber and sufficiently sturdy in construction to withstand rough treatment were not sufficiently sensitive to rapid changes in temperature.

In operation, when the tube $f$ contracts under the influence of relatively low temperature, the rod $h$ depresses the valve $i$ from its seat $l$ and permits pressure fluid to escape through $q$ from the chamber above the diaphragm $b$, the screw or throttle $p$ having been suitably adjusted so as to restrict the inflow into this chamber. The pressure beneath the diaphragm $b$ now lifts the latter and the valve $c$ so that pressure fluid flows through the main port $d$ in the direction of the arrow. As the temperature rises in the room or space to be heated, the tube $f$ becomes warmed and expands and the valve $i$ moves towards its seat $l$, thereby throttling the escape of pressure fluid and causing an increase in pressure in the chamber above the diaphragm so that the latter is then depressed to effect whole or partial closing of the valve $c$. An adjustable bye-pass $d'$ may be provided to permit of a constant flow in addition to the variable flow governed by the valve $c$.

In the constructional example illustrated it is to be noted that the thermostat element $f$ $h$, the auxiliary valve $i$ and the throttle $d$ all lie one above the other on one and the same axis. This disposition considerably simplifies the assemblage of the parts in the commercial production of these instruments and cheapens the manufacture particularly when considering the production of the casing $a$.

The improved device may be arranged in the neighbourhood of the floor and is not liable to be damaged as it possesses substantial strength which also ensures that it is not likely to be damaged in transport or during its installation. Moreover, the improved device is not costly to produce.

I claim:—

1. In mechanism for regulating fluid flow, the combination with a casing having a fluid inlet and outlet and a connecting passage therebetween, of a pressure operated valve for controlling said passage, said valve being subjected on one side to said controlled fluid, a by-pass for fluid to the other side of said valve, means for throttling said by-pass, and means for controlling the pressure of said by-passed fluid, said means comprising an auxiliary valve and a thermostat directly connected thereto, said pressure operated valve, auxiliary valve and thermostat being coaxially disposed.

2. In mechanism for regulating fluid flow, the combination with a casing having a fluid inlet and outlet and a connecting passage therebetween, of a pressure operated valve for controlling said passage, said valve being subjected on one side to said controlled fluid, a by-pass for fluid to the other side of said valve provided in the casing, means for throttling said by-pass, and means for controlling the pressure of said by-passed fluid, said means comprising an auxiliary valve and a thermostat directly connected thereto and forming with the said casing a single constructional unit.

FRIEDRICH JANSSEN.